3,055,961
QUICK DISCONNECTING MEANS FOR EXPENDABLE THERMOCOUPLES
Donald Robertson, Ambler, and Raymond W. Ross, Cheltenham, Pa., assignors to Leeds and Northrup Company, Philadelphia, Pa., a corporation of Pennsylvania
Filed Sept. 11, 1958, Ser. No. 760,332
12 Claims. (Cl. 136—4)

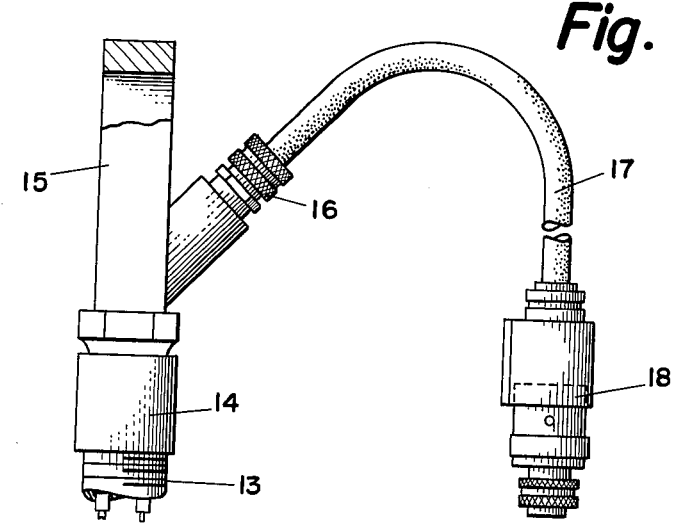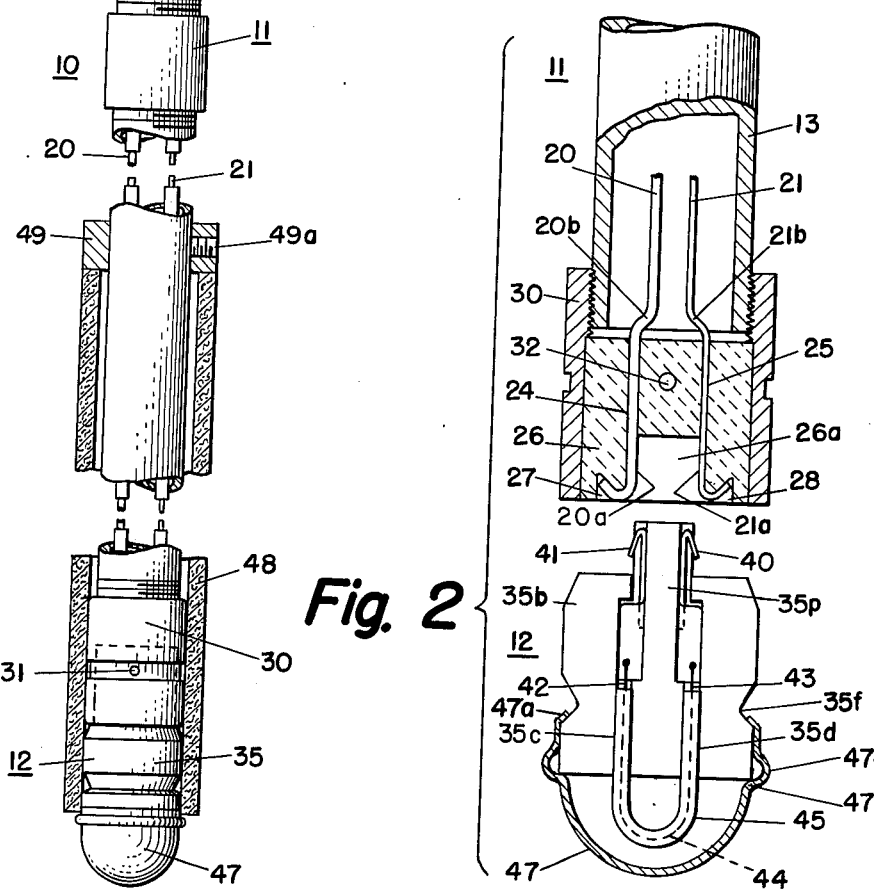

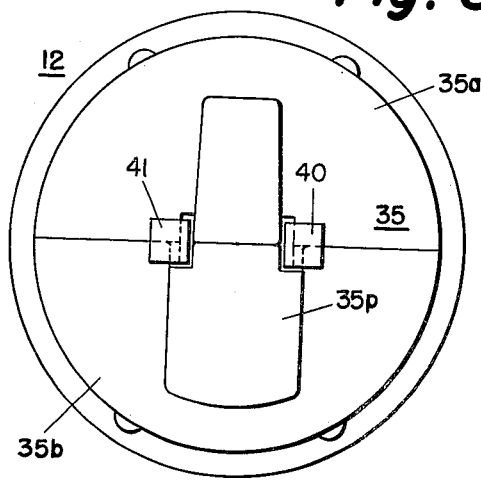
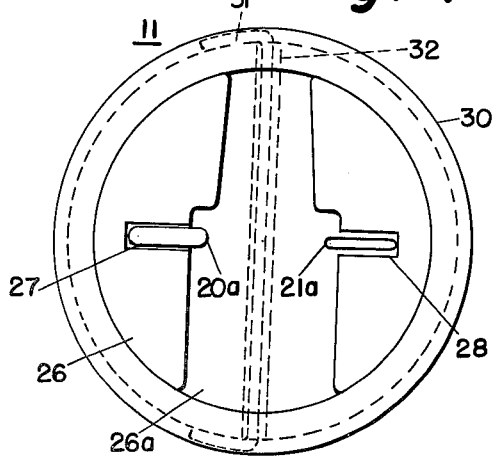
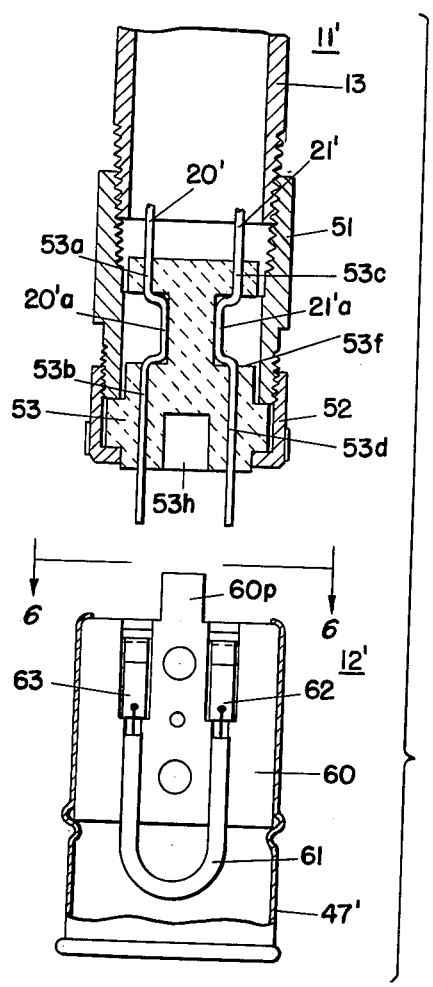
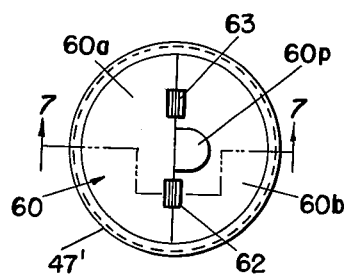

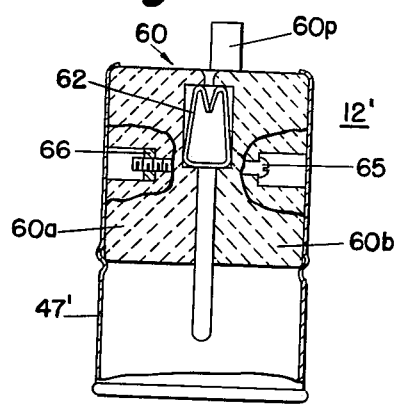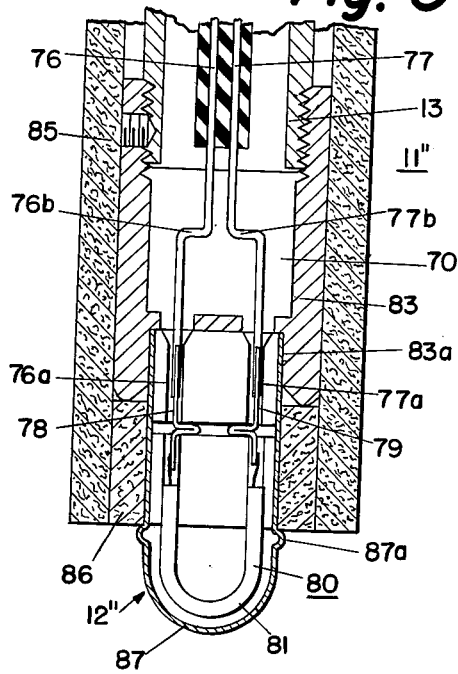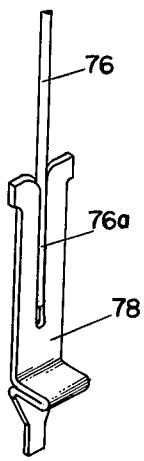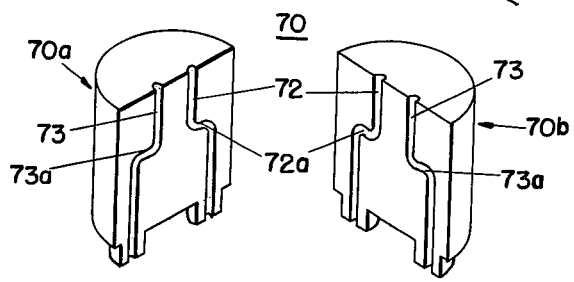

This invention relates to connectors for replaceable plug-in sensing devices and has for an object the provision of quick connecting and disconnecting means and a method of making the same for expendable immersion thermocouples or the like.

Expendable thermocouple systems allow the thermocouple or other sensing unit itself to be used only once and then discarded. Systems of this type are disclosed in the copending applicataion of Harold G. Mead, Serial No. 736,947, filed May 14, 1958, now Patent No. 2,999,121. The use of expendable temperature sensing units such as thermocouple units has become increasingly important particularly in the temperature measurement of molten metals where the temperature thereof is detected by immersing the measuring or hot junction of a thermocouple device in the bath of molten material and allowing it to remain until the thermocouple reaches the temperature of the bath. In such use, due to the high temperatures and the nature of the molten material, non-expendable thermocouples are subject to change of calibration through contamination and, unless frequently checked for accuracy, may give results that are seriously inaccurate. Such inaccuracy is eliminated by using an expendable, low-cost, prefabricated thermocouple unit which may be easily and rapidly connected for use and after immersion in the bath of molten material and the taking of the temperature measurement be discarded and replaced with another similar prefabricated thermocouple unit.

One type of expendable thermocouple unit is adapted to be connected to the lower end of a holder or manipulator and the problem of electrically connecting such units to their holders is a difficult one due to the adverse conditions encountered in molten metal immersion pyrometry. Commercially available connectors are not suitable for this service due to their inability to withstand the high temperatures combined with the corrosive and dirty atmosphere encountered. Expendable thermocouple units or sensing elements of a preferable "plug-in" type may be provided with electrical contacts of either the male or female variety. It is necessary to provide for them a polarized mating contact means at the end of a holder or manipulator that will repeatedly withstand being heated to temperatures in the vicinity of 1000° F. and still provide positive electrical contacting qualities and at the same time be readily replaceable with simple tools in case of accidental damage.

In accordance with the present invention, there is provided a connector for a replaceable plug-in sensing device having an insulating member with passages for receiving lead wires. The lead wires extend through the passages and have bent portions engaging the insulating member to hold the lead wires firmly in position in avoidance of longitudinal displacement thereof relative to the insulator. The terminal portions of the lead wires provide the electrical contact structure for the connector. In the modification shown, the sensing device is an expendable thermocouple. The lead wires are therefore of compensating extension wire material and are of different diameters. The passages in the insulator likewise are of different diameters corresponding to the diameters of the lead wires. When it becomes necessary to renew the contact structure of the connector, the terminal portions of the lead wires are severed and withdrawn from the insulator. The insulator includes structure for polarizing the measuring device, that is to say, the sensing element can only be inserted so that the electrical contacts of proper polarity will engage. The different size of the lead wires and corresponding holes in the insulator will insure that the new sections of wire are threaded through the corresponding passages in the insulator from which the discarded ends are removed. After the new ends of the lead wire have been inserted in the correct passages in the insulator, the terminal portions of the wires are adjusted to provide the new electrical contacts for the connector and the lead wires are deformed at a portion displaced from the portions of the wires which serve as electrical contacts for retention of the wires within the passages of the insulator.

For further objects and advantages of the invention, reference may be had to the following description taken in conjunction with the following drawings in which:

FIG. 1 is an elevational view partially in section and with certain parts broken away showing the preferred embodiment of the invention;

FIG. 2 is an exploded, fractional, sectional view of the electrical connector and expendable thermocouple unit shown in FIG. 1;

FIG. 3 is an end view of the expendable thermocouple unit shown in FIG. 2;

FIG. 4 is an end view of the immersion end of the holder shown in FIG. 2;

FIG. 5 is an exploded view similar to FIG. 2 of a modification of the invention;

FIG. 6 is an end view taken along the lines 6—6 in FIG. 5;

FIG. 7 is a sectional view taken along the lines 7—7 in FIG. 6;

FIG. 8 is a sectional view of a further modification of the invention;

FIG. 9 is a fractional perspective view of the mating contacts of the modification shown in FIG. 8; and FIG. 10 is an exploded perspective view of the connector block of FIG. 8.

Referring to FIG. 1, the invention has been shown as applied to an immersion pyrometer device 10 which includes a manipulator section 11 and an expendable plug-in sensing element section 12. The manipulator section 11 may be of any desired length, but is preferably about eight feet long and is made up of a plurality of steel pipe sections 13 which are threaded at their ends and are adapted to be joined together by coupling members 14. The outer end of the manipulator 11 which is adapted to be held by the operator is provided with a handle 15 having a bushing 16 extending from one side thereof through which the electrical cable 17 is adapted to pass. The outer end of the cable 17 is provided with a suitable electrical connector 18 for connection of the pyrometer device to a temperature measuring system. Such systems are well known in the art, and it is not believed necessary to illustrate them here. The electrical cable 17 is encased in suitable insulation, such as rubber or plastic, extending between the bushing 16 and connector 18. The extension wires 20 and 21 which are inside the cable 17 are insulated from each other through the length of the manipulator section 11 by means of individual insulating sleeves such, for example, as woven glass tubing.

At the lower or immersion end of the manipulator section 11 (see FIG. 2) bare portions of lead wires 20 and 21 of cable 17 are threaded through passages 24 and 25, in an electrical insulator member or contact block 26. The insulator 26 may be formed from ceramic and is provided with recesses or grooves 27 and 28 for receiving bent ends of the respective lead wires 20 and 21. The ends or terminal portions of the lead wires 20 and 21 are adjusted to provide contact portions 20a and 21a respectively by being deformed or bent into the respective recesses 27 and 28. At the opposite end of the insulator 26 portions of the extension wires 20 and 21 are bent at 20b and 21b to cooperate with the bent terminal portions for holding the extension wires firmly in position against the insulator 26 in avoidance of longitudinal displacement of the extension wires when the plug-in section 12 is inserted into the contact block 26. The contact block is adapted to be secured to the lower end of the manipulator section 11 by means of a contact block mounting coupling 30 and a pin 31 which extends through a transverse passage 32 in the block 26 and through aligned openings in the walls of the mounting coupling 30. The upper end of the mounting coupling 30 as shown in FIG. 2 is provided with female threads for engaging the male threads at the lower end of the pipe section 13.

The expandable thermocouple section 12 includes an insulator member illustrated as a ceramic body 35 which, as shown in FIG. 3, comprises a pair of sections 35a and 35b. The body 35 supports contact structures 40 and 41 made of compensating extension wire material the lower ends of which, as seen in FIG. 2 are connected the respective ends of thermocouple elements 42 and 43. The thermocouple elements are joined together to form the heat responsive or measuring junction 44. The elements 42 and 43, including the measuring junction 44, are enclosed within a thin-walled capillary sheath 45 formed of heat-refractory material, such as silica or quartz. The thermocouple construction, including the protective tubing, is more fully described and claimed in the aforementioned copending application. The free ends of the tube extend into the respective passages 35c and 35d of ceramic body 35, the half 35b being shown in FIG. 2.

The conductors or lead wire structures 20 and 21 are selected to be of compensating extension wire material for the thermocouple so that the effective reference junctions for the measuring system will be at the measuring instrument. The contacts 40 and 41 likewise are made of compensating extension wire material in order to preserve continuity of the thermocouple circuit. Those skilled in the art well understand that if the element 42 be of platinum and the element 43 be of an alloy of platinum plus ten percent rhodium, the extension wire 20 will comprise an alloy of essentially nickel and copper (approximately 98% copper, 1% nickel, .5 to .75% manganese and miscellaneous impurities), and the extension wire 21 will be made of copper. The contacts 41 and 40 are made of the same alloy as that used in the compensating extension wires 20 and 21. When thermocouples of other materials are utilized, the extension wires and the contacts may be correspondingly changed to provide the desired results.

As may be seen in FIGS. 2–4, the contact block 26 is provided with a recess or contact cavity 26a which is complementary in shape to the projection 35p comprising a mating contact supporting portion of body 35. This structure provides for proper alignment of the contacts as to polarity before insertion of the expendable thermocouple can take place. Provision is also made for polarizing the lead wires 20 and 21 with respect to the contact block 26. It will be recalled that the passages 24 and 25 through the contact block 26 are of different sizes and that they correspond in size to the size of each of the wires 20 and 21. It is, of course, understood that the extension wires 20 and 21 are sufficiently smaller than their respective passages 24 and 25 so that the extension wires may be easily threaded through their respective passages. By employing different-sized extension wires and corresponding different sized passages in the contact block 26, it is insured that the extension wires will be inserted in the contact block 26 with the correct polarity. This is particularly important when it becomes necessary to renew the terminal ends of the lead wires should they become damaged during service.

As may be seen in FIGS. 2 and 4, the terminal portions of the extension wires 20 and 21 are adapted to have their ends bent into the respective transverse recesses 27 and 28. The adjacent bare terminal portions 20a, 21a of the extension wires which extend longitudinally through the contact cavity 26a provide the contact structure which is adapted to cooperate with the contact structures 41 and 40 of the expendable thermocouple unit 12. The contact block 26 not only provides a polarization cavity for properly aligning the expendable thermocouple unit 12 before insertion, but also provides means for making a satisfactory electrical contact by accurately and positively locating the terminal portions 20a, 21a of the extension wires 20 and 21. Any oxide or dirt on the contacting surface of the terminal portions of the extension wires is effectively removed by the wiping action of the contacts 40 and 41 in the expendable unit 12, thereby resulting in a good electrical circuit.

It sometimes happens that the contacting surfaces or terminal portions of the extension wires become damaged during service. If this occurs, they can be renewed by a simple process. The terminal portions are severed and removed from the contact block 26. Additional portions of the extension wires 20 and 21 of cable 17 are then pulled into place from within the manipulator section 11 by sliding cable 17 through bushing 16, stripping the insulation from the wires and inserting new terminal portions into the connector block 26. The ends of the extension wires 20 and 21 are locked into position by first bending the ends at 20a and 21a into the respective recesses 27 and 28. The wires 20 and 21 are then pulled back so that the ends fit tightly in their respective slots and then the portions of the extension wires 20 and 21 at locations 20b and 21b are bent at the other end of the block as shown in FIG. 2. This locks the extension wires 20 and 21 tightly to the contact block 26 and provides a renewed terminal portion or contact structure for the manipulator section 11. The foregoing operation may be repeated as often as required until all of the cable 17 has been threaded through the bushing 16, thus bringing the connector 18 adjacent the bushing 16. From this it will be seen that the cable 17 which contains the extension wires 20 and 21 forms a source of supply for removing the terminal portions of the extension wires 20 and 21.

To protect the thermocouple assembly, there is provided a metal cap 47 which is adapted to be attached to the immersion end of the body 35, FIGS. 1 and 2. The metal cap 47 is rigidly secured to the body 35 by bending the edge 47a thereof into groove 35f while holding the flange portion 47b thereof tightly against the lower end of the body 35. The cap 47 not only prevents mechanical injury to the thermocouple assembly during shipment and handling, but also protects the assembly from the slag floating on the top of a molten bath, such as steel. The cap 47 is preferably thin-walled so that it will rather quickly melt away after immersion into molten steel, but not until the assembly as a whole has been plunged past the layer of slag at the surface of the bath. Thus at the time the cap 47 melts away, the thermocouple assembly will have been moved to a selected sub-surface level of the bath at which the temperature measurement is to be taken. Caps made of 28-gauge mild carbon steel sheets have been found satisfactory for molten steel. The rapidity with which the cap 47 is melted in the steel may be increased by providing a plurality of small perforations which, while permitting ingress of molten steel, are too small to permit ingress of slag. The cap 47 is provided with a ridge or bead portion 47c which extends around the circumference of the cap and forms a shoulder which is engaged by the lower end of a cardboard or paper protection tube 48 disposed on the lower end of the manipulator section 11, FIG. 1. The upper end of the tube 48 is adapted to engage an adjustable stop collar 49 which is adapted to be held to a pipe section 13 of the manipulator 11 by suitable means such as a set screw 49a. The heavy paper sleeve 48 provides heat insulation, retards deterioration of the pipe 13 and makes easier the removal of slag encrustation. The sleeve 48 is expendable and may be of paper about ¼ inch thick.

Referring to FIG. 5, there is shown a modification of the invention. At the lower end of pipe 13, there is provided a sleeve member 51 and a cooperating threaded collar member 52 which are adapted to hold a ceramic contact block 53 therebetween. The contact block 53 is provided with axial passages 53a–53d extending therethrough and having an annular channel or groove 53f intermediate the ends of the insulator block 53 and into which channel the passages extend. As may be seen, the extension wire 20' is threaded through the passages 53a and 53b and the extension wire 21' is threaded through the passages 53c and 53d. The terminal portions of the extension wires 20' and 21' form contact structure for the connector. Each of the extension wires 20' and 21' is deformed or bent at portions 20'a and 21'a spaced from the terminal portions and is adapted to extend into the annular channel 53f of the insulator 53. The bent portions 20'a and 21'a of the extension wires hold the extension wires 20' and 21' firmly in position with respect to the insulator block 53 in avoidance of longitudinal displacement thereof.

The connector of the manipulator section 11' is adapted to be plugged into the expendable or replaceable sensing unit 12'. The expendable unit 12' includes an insulator member 60 and has passages which are adapted to receive a thermocouple assembly 61 of construction similar to that described in connection with the embodiment shown in FIGS. 1–4. The free ends of the elements of the thermocouple are adapted to be electrically connected to contact structures 62 and 63, FIGS. 6 and 7. As may be seen in FIG. 7, the contact structures 62 and 63 have a spring like construction which is adapted to receive the terminal portions of the respective extension wires 20' and 21'. The insulator block 60 comprises a pair of semi-cylindrical sections 60a and 60b which are adapted to be held together in mating relation by a bolt 65 and nut 66. The expendable unit 12' is provided with a metal protective cap member 47' which is similar to cap 47. The insulator 53 is provided with a polarizing recess 53h which is adapted to cooperate with a mating polarizing projection 60p on the insulator 60. This structure insures that the expendable unit 12' will be connected in correct electrical polarity with the manipulator section 11'. Referring to FIG. 8, there is shown a further modification of the invention. The manipulator section 11'' is provided with an insulator or contact block 70 which, instead of being a single cylindrical member as in the previous embodiments, comprises a pair of mating cylindrical members as shown in FIG. 10. Each of the semi-cylindrical members 70 is provided with longitudinal passages 72 and 73 which have off-set portions 72a and 73a which are adapted to receive an off-set or bent portion of the respective lead wires 76 and 77. The terminal portions 76a and 77a of the lead wires 76 and 77 extend beyond the insulator 70 and thus provide male contact structure for the connector which is adapted to be received by the contacts 78 and 79 of the expendable thermocouple unit 12''. The contacts 78 and 79 frictionally engage the terminal portions 76a and 77a of the respective lead wires 76 and 77. The opposite ends of the contacts 78 and 79 are connected to the respective ends of the thermocouple assembly 80 which is disposed within a quartz sleeve 81 in a manner similar to the embodiments described above. The insulator 70 is disposed within a mounting coupling 83 which is threadedly carried by the lower end of a pipe section 13. The lower end of the coupling 83 is provided with a recess 83a for receiving the contact end of the expendable thermocouple unit 12''. The off-set passage portions 72a and 73a receive the corresponding bent portions 76b and 77b of the lead wires 76 and 77 and prevent the extension wires from being displaced longitudinally of the connector block 70 when the expendable thermocouple unit 12'' is inserted in the immersion end of the manipulator section 11''.

The terminal portions 76a and 77a of the lead wires 76 and 77 may be readily removed or replaced by severing the ends of the extension wires and drawing a new section of the extension wire into the insulator or contact block 70. This is done by removing the insulator 70 from its mounting coupling 83 and separating the insulator sections. The extension wires are then withdrawn from the passages in the insulator and new portions of the extension wires are shaped to fit the off-set portions 72a and 73a of the passages and inserted therein.

The pyrometry device is provided with a protective paper tube 85 and a cooperating paper sleeve 86 which is adapted to be received at the immersion end of the tube 85 and surround the expendable thermocouple unit 12''. A protective metal cap 87 encloses the thermocouple assembly 80 and has a shoulder 87a which engages the outer end of the sleeve 86 to seal the lower end of the pyrometer device from ingress of molten metal.

From the foregoing description, it will be seen that in the various forms of the invention, the extension wires are readily connected to the insulator of the connector by simple bending and the terminal portions of the extension wires themselves form easily renewable contact structure of the connector. Such contact structure is readily replaceable from the supply of lead wire which is contained within the manipulator section of the immersion pyrometer device. In all embodiments of the invention, the contact structure comprising the terminal portions of the extension wires is such that a wiping action results with the contacts of the expendable unit, thus insuring a good electrical connection. The extension wire contact structure of all of the embodiments is readily renewable in the field without the use of special tools and thus reduces the cost to a minimum.

It should be understood that the invention is not limited to the specific arrangement shown and that changes and modifications may be made within the scope of the appended claims.

What is claimed is:

1. The method of making a connector having a replaceable plug-in sensing device comprising the steps of first inserting lead wires in passages in an insulating member until terminal portions of the wires extend therethrough, adjusting the terminal portions of the wires which extend through the passages to provide electrical contact structure for the connector, and thereafter deforming the wires at a portion displaced from the terminal portions of the wires for locking the wires within the passages of the insulating member so as to maintain the terminal portions of the wires in fixed longitudinal position relative to the insulating member of the connector.

2. A connector element for connection with a replaceable plug-in sensing device comprising an insulating member having passages for receiving extension wires, extension wires extending from a source of supply through said pasasges, said extension wires having bent portions engaging said insulating member to hold said extension wires firmly in position in avoidance of longitudinal displacement thereof relative to said insulating member, and terminal portions of said extension wires providing contact structure for electrical connection with complementary contact structure of the plug-in sensing device.

3. A connector according to claim 1 wherein said connector includes an annular channel intermediate the ends of said insulating member and into which channel said passages extend, said annular channel being adapted to receive said bent portions of said wires.

4. A connector according to claim 1 wherein said insulating member comprises a pair of members having mating surfaces, said mating surfaces having grooves to provide said passages, said grooves having an off-set portion to receive said bent portions of said extension wires.

5. A plug-in electrical connector element comprising a body of electrical insulating material, a longitudinal passage extending through said body and having a cavity in an end thereof, a pair of wires, at least one of said wires extending through said passage and into said cavity, both of said wires having a bend at an angle with respect to the longitudinal axis of said body adjacent the outer end of said cavity, each of said wires having a bare longitudinally disposed portion extending substantially parallel to the longitudinal axis of said body constituting contacts of said connector, at least one of said wires having said bare longitudinally disposed portion lying substantially flat against a wall of said cavity, and means preventing movement of said wires relative to said body.

6. A plug-in electrical connector element according to claim 5 wherein said body includes two longitudinal passages each of different cross-sectional area and wherein each of said wires is of correspondingly different cross-sectional area and extends through a corresponding one of said longitudinal passages.

7. A plug-in connector element according to claim 5 wherein said means preventing movement of said wires relative to said body includes an additional bend in each of said wires adjacent said body.

8. An immersion pyrometer device comprising a manipulator section, said section having a connector element including a body of electrical insulating material, longitudinal passages having different cross-sectional areas extending through said body, said manipulator section being of substantial length and having wires extending therethrough, said wires having a length substantially greater than the length of said manipulator section, said wires having portions adjacent their terminal ends extending through said pasasges, said wires having portions extending at an angle with respect to and engaging said body, said wires having bare contact portions disposed parallel to the longitudinal axis of said body and lying substantially flat against the material of said body in a recess formed by wall structure of said body, and said wires having different diameters corresponding to said different cross-sectional areas.

9. A method of renewing the contact structure of the device of claim 8 comprising the steps of severing the wires ahead of said body to provide new ends on the wires, removing the severed wire portions from said body, drawing additional portions of wire through said manipulator, inserting the new ends of the wires in the passages through said body, adjusting the terminal portions of the wires which extend through the passages to provide longitudinally disposed electrical contact structures for the connector, and deforming the wires at points displaced from the contact structures to maintain the terminal portions of the wires fixed relative to said body.

10. A plug-in connector device comprising a connector element having an insulating member with longitudinal passage means extending therethrough and a contact cavity, wires for said connector element having portions extending through said passage means, each of said wires having a bare portion longitudinally disposed in said contact cavity constituting the contact structure of said connector element, said wires lying substantially flat against the wall of said cavity, and radially disposed passageways in said insulating member adjacent the mouth of said contact cavity, said wires having bent portions in said radially disposed passageways in firm engagement with said insulating member.

11. A plug-in connector device according to claim 10 wherein said contact cavity of said insulating member is complementary in shape with projecting structure of a mating connector element and engageable therewith to effect connection of said connector elements in accordance with a predetermined polarity.

12. A plug-in electrical connector element comprising a body of electrical insulating material having inner and outer wall structure extending longitudinally of said body, a pair of electrical conducting wires extending through said body, said wires having bare portions of short length constituting the contact structures of said connector element, and means to hold said contact structures substantially flat against said inner wall structure of said body.

References Cited in the file of this patent

UNITED STATES PATENTS

| | | |
|---|---|---|
| 1,157,026 | Meschenmoser | Oct. 19, 1915 |
| 1,464,602 | Garcillan | Aug. 14, 1923 |
| 1,615,302 | Hartmann | Jan. 25, 1927 |
| 2,030,856 | Dillig | Feb. 18, 1936 |
| 2,406,154 | Medlin | Aug. 20, 1946 |
| 2,463,427 | Richards | Mar. 1, 1949 |
| 2,481,027 | Lawrence | Sept. 6, 1949 |
| 2,502,860 | Leithiser | Apr. 4, 1950 |
| 2,511,037 | Bedoiseau | June 13, 1950 |
| 2,556,238 | Tingle | June 12, 1951 |
| 2,662,219 | Hennessey et al. | Dec. 8, 1953 |
| 2,672,493 | Tingle et al. | Mar. 16, 1954 |
| 2,699,534 | Klostermann | Jan. 11, 1955 |
| 2,709,246 | Abbott | May 24, 1955 |

FOREIGN PATENTS

| | | |
|---|---|---|
| 367,353 | Germany | Jan. 20, 1923 |

OTHER REFERENCES

Vennerholm et al.: Trans. Am. Foundrymen's Assoc., 1947, vol. 55, pages 505–509.

UNITED STATES PATENT OFFICE
CERTIFICATE OF CORRECTION

Patent No. 3,055,961 September 25, 1962

Donald Robertson et al.

It is hereby certified that error appears in the above numbered patent requiring correction and that the said Letters Patent should read as corrected below.

Column 6, lines 66 and 71, for the claim reference numeral "1", each occurrence, read -- 2 --.

Signed and sealed this 3rd day of May 1966.

(SEAL)
Attest:

ERNEST W. SWIDER
Attesting Officer

EDWARD J. BRENNER
Commissioner of Patents